(12) United States Patent
Adachi

(10) Patent No.: US 10,384,342 B2
(45) Date of Patent: Aug. 20, 2019

(54) HORIZONTAL ARTICULATED ROBOT

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/865,452

(22) Filed: Jan. 9, 2018

(65) Prior Publication Data

US 2018/0229360 A1 Aug. 16, 2018

(30) Foreign Application Priority Data

Feb. 15, 2017 (JP) ................................. 2017-025941

(51) Int. Cl.
*B25J 9/04* (2006.01)
*B25J 18/00* (2006.01)
(Continued)

(52) U.S. Cl.
CPC ............... *B25J 9/044* (2013.01); *B25J 9/042* (2013.01); *B25J 9/046* (2013.01); *B25J 18/007* (2013.01);
(Continued)

(58) Field of Classification Search
CPC ... B25J 9/042; B25J 9/044; B25J 9/043; B25J 9/045; B25J 9/046; B25J 9/102; B25J 9/106; B25J 18/007; B25J 19/0025
(Continued)

(56) References Cited

U.S. PATENT DOCUMENTS

| 4,907,467 A * | 3/1990 | Toyoda .................... B25J 9/042 |
| | | 74/490.03 |
| 2009/0007713 A1* | 1/2009 | Meyerhoff ............... B25J 9/044 |
| | | 74/490.01 |

(Continued)

FOREIGN PATENT DOCUMENTS

| CN | 105150204 A | 12/2015 |
| JP | H05-2891 U | 1/1993 |

(Continued)

OTHER PUBLICATIONS

Japanese Decision to Grant a Patent dated Dec. 4, 2018, in connection with corresponding JP Application No. 2017-025941 (6 pgs., including English transaltion).
(Continued)

*Primary Examiner* — Victor L MacArthur
*Assistant Examiner* — Joseph Brown
(74) *Attorney, Agent, or Firm* — Maier & Maier, PLLC

(57) ABSTRACT

A horizontal articulated robot including a base, a first arm provided above the base so as to be capable of rotating about a first axis, a first driving part configured to cause the first arm to rotate with respect to the base, a second arm attached so as to be capable of rotating about a second axis, and a second driving part configured to cause the second arm to rotate with respect to the first arm. The first driving part includes a first motor and a first reduction gear that are arranged in series along the first axis. The second driving part includes a second motor and a second reduction gear which are arranged in series along the second axis. A lower surface of the second reduction gear is disposed at a position lower than an upper surface of the first reduction gear.

3 Claims, 3 Drawing Sheets

(51) Int. Cl.
  *B25J 19/00* (2006.01)
  *B25J 9/12* (2006.01)
  *B25J 9/10* (2006.01)

(52) U.S. Cl.
  CPC ............ *B25J 19/0025* (2013.01); *B25J 9/102* (2013.01); *B25J 9/126* (2013.01)

(58) Field of Classification Search
  USPC ........ 74/490.01, 490.02; 901/15, 17, 18, 25, 901/28
  See application file for complete search history.

(56) References Cited

U.S. PATENT DOCUMENTS

| | | | | |
|---|---|---|---|---|
| 2009/0095111 | A1* | 4/2009 | Kitahara | B25J 9/042 74/490.05 |
| 2012/0201641 | A1 | 8/2012 | Matsuzaki et al. | |
| 2012/0215356 | A1* | 8/2012 | Igarashi | B25J 9/1641 700/258 |
| 2014/0109712 | A1* | 4/2014 | Ono | B25J 9/042 74/490.02 |
| 2016/0046020 | A1* | 2/2016 | Chuo | B25J 9/1615 74/490.02 |
| 2016/0368140 | A1* | 12/2016 | Yazawa | B25J 19/0054 |
| 2017/0182669 | A1* | 6/2017 | Bordegnoni | B25J 9/044 |

FOREIGN PATENT DOCUMENTS

| | | | |
|---|---|---|---|
| JP | 2001-293673 A | 10/2001 | |
| JP | 2012-161858 A | 8/2012 | |
| JP | 2013-6238 A | 1/2013 | |
| JP | 2013022715 A * | 2/2013 | ............. B25J 9/044 |
| JP | 2013-220488 A | 10/2013 | |
| JP | 2014-4638 A | 1/2014 | |
| JP | 2014-144527 A | 8/2014 | |
| JP | 2016-198881 A | 12/2016 | |
| WO | WO-2014125691 A1 * | 8/2014 | ............. B25J 9/044 |

OTHER PUBLICATIONS

Japanese Office Action dated Sep. 25, 2018, in connection with corresponding JP Application No. 2017-025941 (9 pgs., including English translation).
Office Action dated May 15, 2019 in Chinese Application No. 201810138989.0; 13 pages including English-language translation.

* cited by examiner

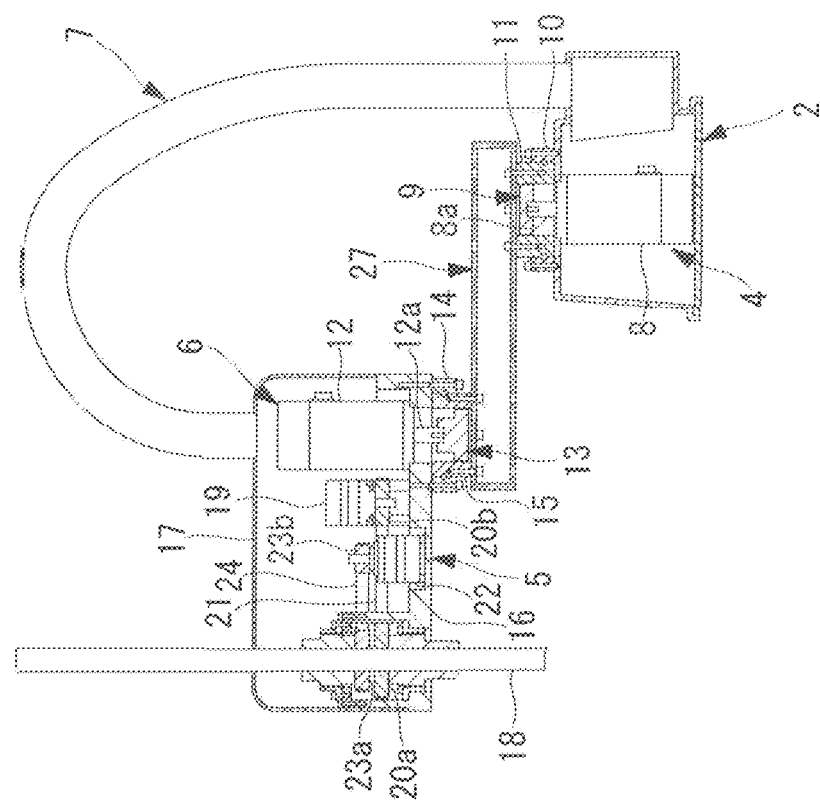
FIG. 2A
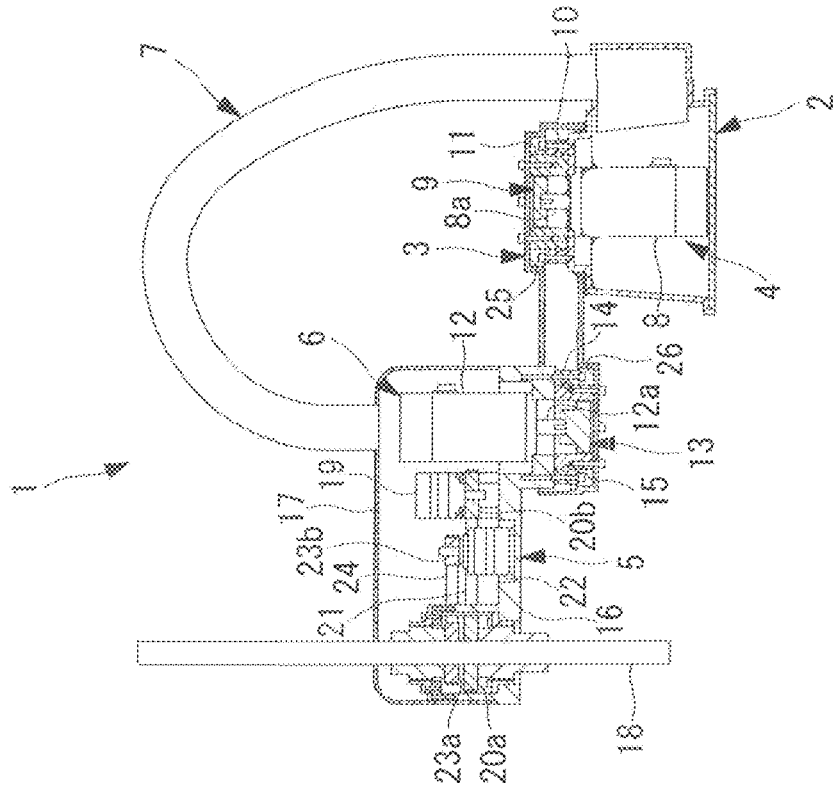
FIG. 2B - PRIOR ART

HORIZONTAL ARTICULATED ROBOT

CROSS-REFERENCE TO RELATED APPLICATIONS

This application is based on Japanese Patent Application No. 2017-25941, the contents of which are incorporated herein by reference.

TECHNICAL FIELD

The present invention relates to a horizontal articulated robot.

BACKGROUND

A horizontal articulated robot including a base, a first arm having one end attached to the base so as to be capable of rotating about a first vertical axis, and a second arm attached to the other end of the first arm so as to be capable of rotating about a second vertical axis, a cable for driving a motor mounted on the second arm being attached in an inverted J-shape between the base and the second arm has heretofore been known (for example, see Japanese Publication No. 2014-4638).

In the horizontal articulated robot discussed in JP 2014-4638, a reduction gear for causing the first arm to rotate is fixed to a lower surface at one end of the first arm having a hallow square pipe shape extending in the horizontal direction, and a reduction gear for causing the second arm to rotate is fixed to an upper surface at the other end of the first arm. A motor for causing the first arm to rotate is accommodated in the base and a motor for causing the second arm to rotate is accommodated in the second arm.

SUMMARY

An aspect of the present invention provides a horizontal articulated robot including: a base; a first arm having one end provided above the base so as to be capable of rotating about a first vertical axis; a first driving part configured to cause the first arm to rotate with respect to the base; a second arm provided above another end of the first arm so as to be capable of rotating about a second vertical axis; and a second driving part configured to cause the second arm to rotate with respect to the first arm. The first driving part includes a first motor and a first reduction gear disposed above the first motor and configured to decelerate the rotation of the first motor, the first motor and the first reduction gear being arranged in series along the first vertical axis; the second driving part includes a second motor and a second reduction gear disposed below the second motor and configured to decelerate the rotation of the second motor, the second motor and the second reduction gear being arranged in series along the second vertical axis. A lower surface of the second reduction gear is disposed at a position lower than an upper surface of the first reduction gear.

BRIEF DESCRIPTION OF DRAWINGS

FIG. 2A is a longitudinal sectional view illustrating the horizontal articulated robot illustrated in FIG. 1.

FIG. 2B is a longitudinal sectional view illustrating a horizontal articulated robot of related art.

DETAILED DESCRIPTION

A horizontal articulated robot 1 according to an embodiment of the present invention will be described below with reference to the drawings.

Figure 1:
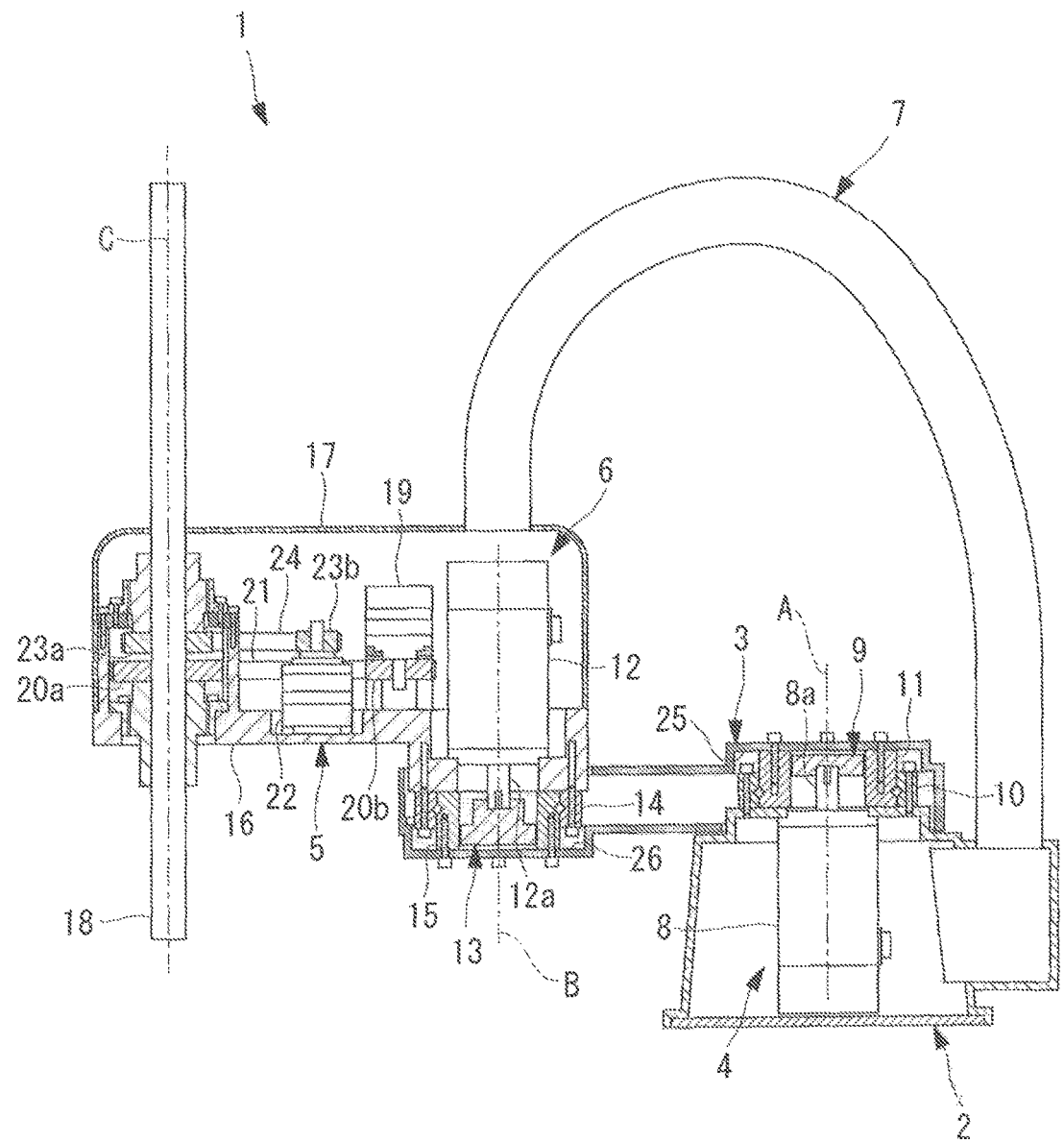
FIG. 1 is a longitudinal sectional view illustrating a horizontal articulated robot according to an embodiment of the present invention.

As illustrated in FIG. 1, the horizontal articulated robot 1 according to the present embodiment includes a base 2 that is installed on a floor surface or the like, a first arm 3 having one end attached to an upper part of the base 2 so as to be capable of rotating about a first vertical axis A, a first driving part 4 that causes the first arm 3 to rotate with respect to the base 2, a second arm 5 that is attached to the other end of the first arm 3 so as to be capable of rotating about a second vertical axis B, a second driving part 6 that causes the second arm 5 to rotate with respect to the first arm 3, and a cable conduit 7 that extends so as to connect the base 2 and the second arm 5 and guides a cable (not illustrated) for, for example, supplying power to a second motor 12, a third motor 19, and a fourth motor 22 which are provided in the second arm 5 and described below.

The base 2 is formed in a hollow box shape, and accommodates a first motor 8 that constitutes the first driving part 4.

The first driving part 4 includes the first motor 8 and a first reduction gear 9 which are arranged in series along the first axis A. In the first motor 8, an output shaft 8a is disposed vertically upward and the output shaft 8a is inserted into the first reduction gear 9 that is disposed upward. The output shaft 8a is provided with a gear that meshes with an input gear, which is not illustrated, in the first reduction gear 9.

The first reduction gear 9 includes a mounting part 10 that is formed in a disc shape having a predetermined thickness and is fixed to an upper surface of the base 2, and an output shaft 11 that is supported so as to be capable of rotating about the first axis A with respect to the mounting part 10. The first reduction gear 9 decelerates the rotation of the first motor 8 and amplifies the torque of the first motor 8 according to an inverse of a reduction ratio to cause the output shaft 11 to rotate.

The second driving part 6 includes the second motor 12 and a second reduction gear 13 which are arranged in series along the second axis B. In the second motor 12, an output shaft 12a is disposed vertically downward and the output shaft 12a is inserted into the second reduction gear 13 which is disposed downward. The output shaft 12a is provided with a gear that meshes with an input gear, which is not illustrated, in the second reduction gear 13.

The second reduction gear 13 includes a mounting part 14 that is formed in a disc shape having a predetermined thickness and is fixed to the second arm 5, and an output shaft 15 that is supported so as to be capable of rotating about the second axis B with respect to the mounting part 14. The second reduction gear 13 decelerates the rotation of the second motor 12 and amplifies the torque of the second motor 12 according to an inverse of a reduction ratio to cause the output shaft 15 to rotate.

The second arm 5 includes a base part 16 to which the second motor 12 and the mounting part 14 of the second reduction gear 13 is attached, and a cover 17 that is attached to the base part 16 and accommodates the second motor 12 and the like between the cover 17 and the base part 16. The base part 16 includes a ball screw spline shaft 18 that is disposed so as to penetrate through an end of the second arm 5 in the vertical direction and is supported so as to be capable of moving in the vertical direction and rotating about a third axis C. In a space between the base part 16 and the cover 17, the third motor 19, pulleys 20a and 20b, and a belt 21 for causing the ball screw spline shaft 18 to rotate about the third axis C and the fourth motor 22, pulleys 23a and 23b, and a belt 24 for causing the ball screw spline shaft 18 to move in the vertical direction are accommodated.

The first arm 3 includes a first recess 25 that accommodates the first reduction gear 9, and a second recess 26 that accommodates the second reduction gear 13. The first recess 25 is recessed upward from the lower surface of the first arm 3 extending horizontally. The second recess 26 is recessed downward from an upper surface of the first arm 3. The output shaft 11 of the first reduction gear 9 is fixed to a bottom surface of the first recess 25. The output shaft 15 of the second reduction gear 13 is fixed to a bottom surface of the second recess 26.

Thus, in the present embodiment, the lower surface of the second reduction gear 13 is disposed below the upper surface of the first reduction gear 9. The two reduction gears 9 and 13 are disposed at positions overlapping each other in the height direction in the first arm 3.

The cable conduit 7 is a tube formed of a flexible material that is deformable by an external force. A lower end of a linear part that rises vertically upward from the upper surface of the base 2, is curved in an inverted J-shape, and extends along the second axis B is fixed to an upper surface of the cover 17 of the second arm 5. The cable conduit 7 accommodates a cable for supplying power and transmitting signals to the second motor 12 accommodated in the second arm 5, the third motor 19 for causing the ball screw spline shaft 18 to rotate, and the fourth motor 22 for causing the ball screw spline shaft 18 to vertically move.

The operation of the horizontal articulated robot 1 according to the present embodiment having a structure as described above will be described below.

When the first motor 8 of the first driving part 4 is activated, the rotation of the first motor 8 is decelerated by the first reduction gear 9 to amplify the torque, thereby causing the output shaft 11 to rotate about the first axis A with respect to the mounting part 10. Since the mounting part 10 is fixed to the upper surface of the base 2 and the output shaft 11 is fixed to the bottom surface of the first recess 25 of the first arm 3, driving of the first motor 8 allows the first arm 3 to horizontally rotate about the first axis A with respect to the base 2.

When the second motor 12 of the second driving part 6 is operated, the rotation of the second motor 12 is decelerated by the second reduction gear 13 to amplify the torque, thereby causing the output shaft 15 to rotate about the second axis B with respect to the mounting part 14. Since the mounting part 14 is fixed to the lower surface of the base part 16 of the second arm 5 and the output shaft 15 is fixed to the bottom surface of the second recess 26 of the first arm 3, driving of the second motor 12 allows the second arm 5 to horizontally rotate about the second axis B with respect to the first arm 3. A combination of the rotation of the first arm 3 and the rotation of the second arm 5 enables two-dimensional change of the horizontal position of the ball screw spline shaft 18 that is held at an end of the second arm 5.

In this case, the horizontal articulated robot 1 according to the present embodiment has a structure in which the lower surface of the second reduction gear 13 of the second driving part 6 for driving the second arm 5 is disposed at a position lower than the upper surface of the first reduction gear 9 of the first driving part 4 for driving the first arm 3, which is advantageous in that the height dimension from the lower surface of the base 2 to the upper surface of the second arm 5 can be considerably reduced and the horizontal articulated robot can be compact as illustrated in FIG. 2A, unlike in the related art in which the first reduction gear 9, the first arm 27, and the second reduction gear 13 are superimposed in the height direction as illustrated in FIG. 2B.

As described above, the height dimension up to the upper surface of the second arm 5 is considerably reduced, which is advantageous in that the total height including the cable conduit 7 can be sufficiently suppressed even when the flexible cable conduit 7 is attached like in the related art.

Figure 3:
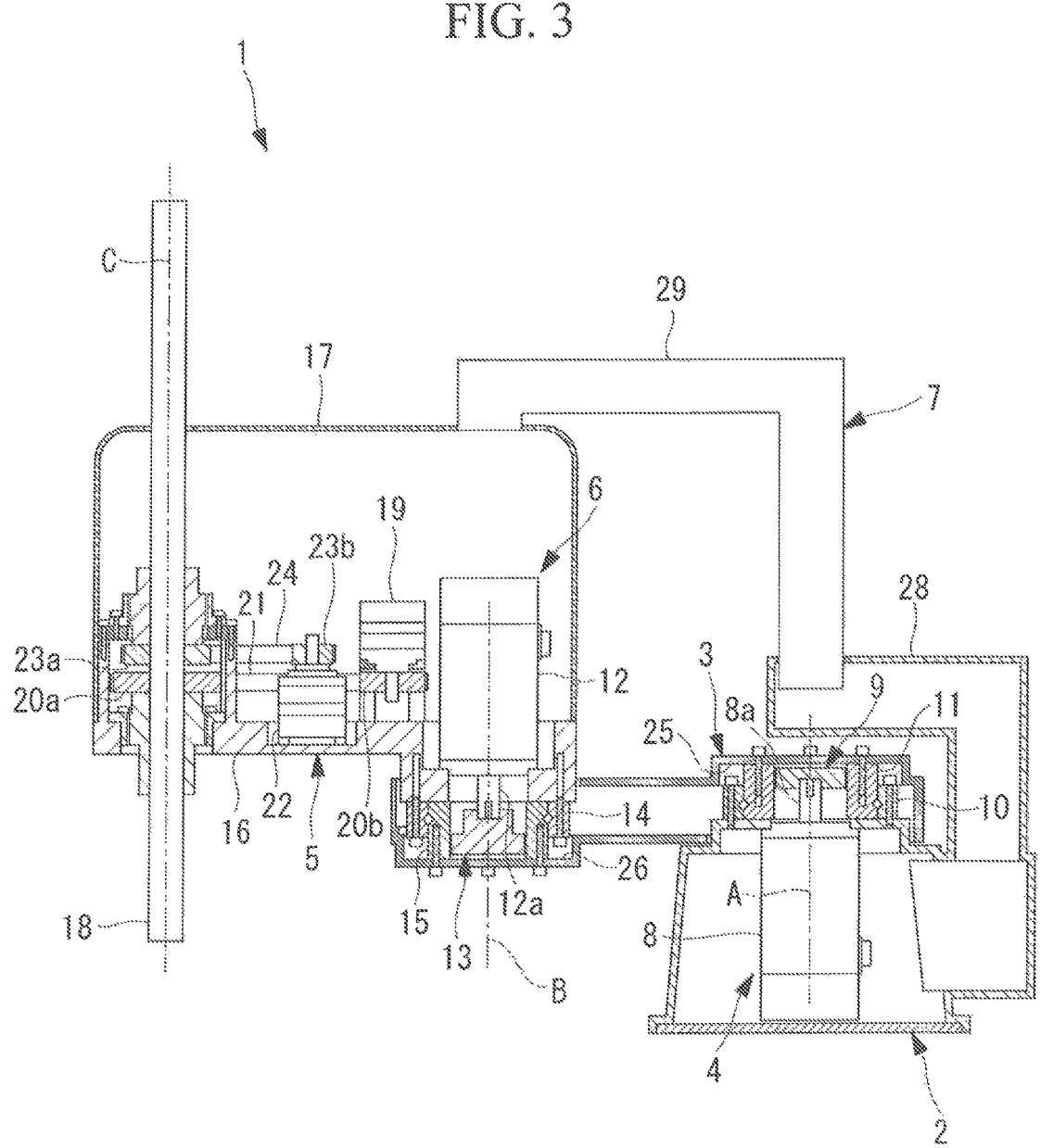
FIG. 3 is a longitudinal sectional view illustrating a modified example of the horizontal articulated robot illustrated in FIG. 1.

In the horizontal articulated robot 1 according to the present embodiment, a cable conduit formed of a flexible material is illustrated as the cable conduit 7. Instead, as illustrated in FIG. 3, a structure which includes a fixed conduit 28 that is fixed to the base 2 and a movable conduit 29 that is disposed between the fixed conduit 28 and the upper surface of the cover 17 of the second arm 5, and which is formed of a hard material. In this case, the movable conduit 29 is connected to the upper surface of the cover 17 of the second arm 5 so as to be capable of rotating about the second axis B, and is connected to the fixed conduit 28 so as to be capable of rotating about the first axis A.

Specifically, as described above, since the height dimension from the lower surface of the base 2 to the upper surface of the second motor 12 can be sufficiently reduced, a space can be formed between the cover 17 and the upper surface of the second motor 12 by maintaining the upper surface of the second arm 5 at a height similar to that in the related art. In this space, the twist of the cable due to the rotation of the second arm 5 can be absorbed by the portion where the cable is disposed in the vertical direction along the second axis B. Accordingly, the following advantages are obtained. That is, there is no need to displace the cable in the movable conduit 29 and the movable conduit 29 can be formed in a tubular shape linearly extending substantially in the horizontal direction, so that the horizontal articulated robot 1 in which the total height including the cable conduit 7 can be considerably reduced can be obtained.

From the above-described embodiments and modifications thereof, the following aspects of the invention are derived.

An aspect of the present invention provides a horizontal articulated robot including: a base; a first arm having one end provided above the base so as to be capable of rotating about a first vertical axis; a first driving part configured to cause the first arm to rotate with respect to the base; a second arm provided above another end of the first arm so as to be capable of rotating about a second vertical axis; and a second driving part configured to cause the second arm to rotate with respect to the first arm. The first driving part includes a first motor and a first reduction gear disposed above the first motor and configured to decelerate the rotation of the first motor, the first motor and the first reduction gear being arranged in series along the first vertical axis; the second driving part includes a second motor and a second reduction gear disposed below the second motor and configured to decelerate the rotation of the second motor, the second motor and the second reduction gear being arranged in series along the second vertical axis. A lower surface of the second reduction gear is disposed at a position lower than an upper surface of the first reduction gear.

According to the aspect, when the first motor is driven, the reduction gear amplifies a torque of the first motor, thereby causing the first arm to horizontally rotate about the first axis with respect to the base. When the second motor is driven, the second reduction gear amplifies a torque of the second motor, thereby causing the second arm to horizontally rotate about the second axis with respect to the first arm. The first reduction gear and the second reduction gear have a predetermined thickness dimension. However, when the lower surface of the second reduction gear is disposed at a position lower than the upper surface of the first reduction gear, at least a part of the first reduction gear and a part of the second reduction gear in the thickness direction are disposed in an overlapping manner in the vertical direction. Consequently, the height dimension from the base to the upper surface of the second motor can be reduced and thus the horizontal articulated robot can be formed compact as compared with the related art.

In the aspect described above, the horizontal articulated robot may include a cable conduit through which a cable passes, one end of the cable conduit being attached to the base, another end of the cable conduit being attached to the second arm vertically above the second motor.

With this structure, the cable conduit can be mounted on the second arm at a lower position, so that the total height including the cable conduit can be suppressed and thus the horizontal articulated robot can be formed compact.

In the aspect described above, an upper surface of the second arm may be spaced apart vertically above the second motor, and the cable conduit may include a fixed conduit fixed to the base, and a movable conduit attached to the upper surface of the second arm so as to be capable of rotating about the second axis and also attached to the fixed conduit so as to be capable of rotating about the first axis.

With this structure, a space for allowing the twist of the cable can be formed between the second motor and the upper surface of the second arm; there is no need to absorb the twist of the movable conduit; and the movable conduit can be formed of a hard material. Consequently, there is no need to curve the cable in an inverted J-shape, unlike the flexible conduit, and the total height including the cable conduit can be suppressed and thus the horizontal articulated robot can be formed compact.

REFERENCE SIGNS LIST

1 horizontal articulated robot
2 base
3 first arm
4 first driving part
5 second arm
6 second driving part
7 cable conduit
9 first reduction gear
13 second reduction gear
28 fixed conduit
29 movable conduit
A first axis
B second axis

The invention claimed is:

1. A horizontal articulated robot comprising:
   a base;
   a first arm having one end provided above the base so as to be capable of rotating about a first vertical axis;
   a first driving part configured to cause the first arm to rotate with respect to the base;
   a second arm provided above another end of the first arm so as to be capable of rotating about a second vertical axis; and
   a second driving part configured to cause the second arm to rotate with respect to the first arm, wherein
   the first driving part includes a first motor and a first reduction gear disposed above the first motor and configured to decelerate rotation of the first motor, the first motor and the first reduction gear being arranged in series along the first vertical axis,
   the second driving part includes a second motor and a second reduction gear disposed below the second motor and configured to decelerate rotation of the second motor, the second motor and the second reduction gear being arranged in series along the second vertical axis, and wherein
   the first arm includes a first recess that is provided on an end of the one end side and that is recessed upward, and a second recess that is provided on an end of the another end side and that is recessed downward, the first recess accommodates the first reduction gear and the second recess accommodates the second reduction gear, and
   a lower surface of the second reduction gear is disposed at a position lower than a lower surface of the first reduction gear.

2. The horizontal articulated robot according to claim 1, further comprising a cable conduit through which a cable passes, one end of the cable conduit being attached to the base, another end of the cable conduit being attached to the second arm vertically above the second motor.

3. The horizontal articulated robot according to claim 2, wherein
   an upper surface of the second arm is spaced apart vertically above the second motor, and
   the cable conduit includes a fixed conduit fixed to the base, and a movable conduit attached to the upper surface of the second arm so as to be capable of rotating about the second vertical axis and also attached to the fixed conduit so as to be capable of rotating about the first vertical axis.

* * * * *